(12) United States Patent
Zhan et al.

(10) Patent No.: US 9,416,462 B2
(45) Date of Patent: Aug. 16, 2016

(54) MACHINING SYSTEMS AND METHODS

(75) Inventors: Yimin Zhan, Shanghai (CN); Yuanyuan Guo, Shanghai (CN); Yuanfeng Luo, Clifton Park, NY (US); Renewi Yuan, Shanghai (CN); Zhixue Peng, Shanghai (CN); Garth M. Nelson, Ballston Lake, NY (US); Massimo Arcioni, Pistoia (IT); Francescosaverio Chiari, Florence (IT); Hongtao Li, Shanghai (CN)

(73) Assignee: General Electric Company, Schenectady, NY (US)

( * ) Notice: Subject to any disclaimer, the term of this patent is extended or adjusted under 35 U.S.C. 154(b) by 168 days.

(21) Appl. No.: 13/823,520

(22) PCT Filed: Sep. 13, 2011

(86) PCT No.: PCT/US2011/051392
§ 371 (c)(1),
(2), (4) Date: May 2, 2013

(87) PCT Pub. No.: WO2012/037121
PCT Pub. Date: Mar. 22, 2012

(65) Prior Publication Data
US 2013/0220826 A1 Aug. 29, 2013

(30) Foreign Application Priority Data
Sep. 14, 2010 (CN) .......................... 2010 1 0282608

(51) Int. Cl.
*B23H 5/04* (2006.01)
*B23H 9/00* (2006.01)
(Continued)

(52) U.S. Cl.
CPC .. *C25F 7/00* (2013.01); *B23H 5/04* (2013.01); *B23H 9/00* (2013.01); *B23H 9/10* (2013.01); *C25F 3/02* (2013.01); *C25F 3/14* (2013.01); *B23H 2600/12* (2013.01)

(58) Field of Classification Search
CPC ............................. B23H 9/10; B23H 2600/12
See application file for complete search history.

(56) References Cited

U.S. PATENT DOCUMENTS 4,703,142 A 10/1987 Dzewaltowski
4,996,726 A 3/1991 Schrock et al.
(Continued)

FOREIGN PATENT DOCUMENTS

EP 0267718 5/1988
EP 1932611 6/2008
(Continued)

OTHER PUBLICATIONS

PCT Search Report and Written Opinion from corresponding PCT Application No. PCT/US2011/051392, Dated Dec. 8, 2011.
(Continued)

*Primary Examiner* — Nicholas A Smith
(74) *Attorney, Agent, or Firm* — GE Global Patent Operation

(57) ABSTRACT

A machining system for machining a workpiece is provided. The machining system comprises a machine tool, a plurality of cutting tools, a CNC controller. The plurality of cutting tools comprises an electrode and a conventional cutting tool exchangeably disposed on the machine tool. The machining system further comprises a power supply, a process controller, and an electrolyte supply, wherein the machine tool, the electrode, the CNC controller, the power supply, the process controller and the electrolyte supply are configured to cooperate to function as an electroerosion machining device, wherein the machine tool, the CNC controller, the conventional cutting tool and the electrolyte supply are configured to cooperate to function as a conventional machining device, and wherein the machining system is configured to function alternately as the electroerosion machining device and the conventional machining device.

5 Claims, 2 Drawing Sheets

(51) Int. Cl.
　　*B23H 9/10*　　　(2006.01)
　　*C25F 7/00*　　　(2006.01)
　　*C25F 3/02*　　　(2006.01)
　　*C25F 3/14*　　　(2006.01)

(56) References Cited

U.S. PATENT DOCUMENTS

| | | | |
|---|---|---|---|
| 4,996,762 | A | 3/1991 | Takayama |
| 5,281,788 | A | 1/1994 | Abiko |
| 7,377,036 | B2 | 5/2008 | Johnson et al. |
| 7,394,040 | B2 | 7/2008 | Wei |
| 7,608,795 | B2 | 10/2009 | Jaques |
| 8,581,136 | B2 | 11/2013 | Kishimoto et al. |
| 2004/0168288 | A1* | 9/2004 | Rahman et al. .......... 29/35.5 |
| 2007/0256939 | A1 | 11/2007 | Wei |

FOREIGN PATENT DOCUMENTS

| | | |
|---|---|---|
| JP | 54024379 | 2/1979 |
| JP | 02145232 A | 6/1990 |
| JP | 05277938 A | 10/1993 |
| JP | 2833314 B2 | 12/1998 |
| JP | 2006112775 A | 4/2006 |
| JP | 2010089190 A | 4/2010 |

OTHER PUBLICATIONS

Unofficial English translation of Office Action issued in connection with corresponding JP Application No. 2013-529265 on Aug. 11, 2015.

Office Action issued in connection with corresponding EG Application No. PCT373/2013 on Aug. 19, 2015.

* cited by examiner

MACHINING SYSTEMS AND METHODS

CROSS REFERENCE TO RELATED APPLICATIONS

This is a national stage application under 35 U.S.C. §371 (c) prior-filed, co-pending PCT patent application serial number PCT/US2011/051392, filed on Sep. 13, 2011, which claims priority to Chinese Patent Application No. 201010282608.X, filed on Sep. 14, 2010, the entire contents of which are incorporated herein by reference.

BACKGROUND OF THE INVENTION

Embodiments of the present invention relate generally to machining systems and methods, and more particularly to machining systems and methods employing electromachining such as electroerosion machining.

Electromachining, such as electro discharge machining (EDM) and electrochemical machining (ECM), are conventional electromachining processes for machining objects such as gas turbine components. In ECM, an electrolyte is circulated between an electrode and a workpiece for permitting electrochemical dissolution of workpiece materials, as well as cooling and flushing a gap therebetween. EDM processes circulate a nonconductive (dielectric) liquid in a gap between an electrode and a workpiece to permit electrical discharges in the gap to remove workpiece materials.

As used herein, the term "electroerosion" should be understood to apply to those electromachining processes that circulate an electrolyte in the gap between the electrode(s) and the workpiece, these processes enabling a high rate of material removal and reducing thermal damages to the workpiece.

Machining systems, such as computer numerical controlled (CNC) machines (or "machining centers") are widely used for machining workpieces. However, during conventional machining processes, such as conventional full milling processes, when such machining systems machine workpieces, for example, workpieces having complex geometries and/or higher hardness, it is difficult and time-consuming, and the cutting tool cost is higher. On the contrary, the electroerosion machining has advantages of noncontact machining, higher efficiency and lower cutting tool cost.

Therefore, there is a need for a new and improved machining systems and methods employing electromachining such as electroerosion machining.

BRIEF SUMMARY OF THE INVENTION

A machining system for machining a workpiece is provided in accordance with an embodiment of the present invention. The machining system comprises a machine tool, a plurality of cutting tools configured to machine a workpiece, and a CNC controller configured to control the machine tool to move the respective cutting tools relative to the workpiece. The plurality of tools comprises an electrode and a conventional cutting tool exchangeably disposed on the machine tool. The machining system further comprises a power supply configured to energize the electrode and the workpiece to opposite electrical polarities, a process controller configured to monitor gap status between the electrode and the workpiece, and communicate with the CNC controller to control the machine tool, and an electrolyte supply configured to pass an electrolyte between the workpiece and the respective cutting tools. Wherein the machine tool, the electrode, the CNC controller, the power supply, the process controller and the electrolyte supply are configured to cooperate to function as an electroerosion machining device, and the machine tool, the CNC controller, the conventional cutting tool and the electrolyte supply are configured to cooperate to function as a conventional machining device, and wherein the machining system is configured to function alternately as the electroerosion machining device and the conventional machining device.

A method for making a machined workpiece comprising one or more conduits is provided in accordance with an embodiment of the present invention. The method comprises (a) identifying the position and dimensions of each of the one or more conduits to be formed in a workpiece, each of the one or more conduits to be formed comprising at least two target zones; (b) performing a first electroerosion machining step to define a first cavity within a first target zone of each of the one or more conduits to be formed; (c) performing a second electroerosion machining step to define a second cavity within a second target zone of each of the one or more conduits to be formed; (d) performing a first conventional machining step on the first cavity within the first target zone of each of the one or more conduits to be formed; and (e) performing a second conventional machining step on the second cavity within the second target zone of each of the one or more conduits to be formed.

An embodiment of the present invention further provides a method for making a machined workpiece comprising one or more conduits. The method comprises: (a) identifying the position and dimensions of each of the one or more conduits to be formed in a workpiece, each of the one or more conduits to be formed comprising at least two target zones; (b) performing a first electroerosion machining step to define a first cavity within a first target zone of each of the one or more conduits to be formed; and (c) performing a second electroerosion machining step to define a second cavity within a second target zone of each of the one or more conduits to be formed. Wherein the first cavity and the second cavity are defined within the at least two respective target zones along opposite directions.

BRIEF DESCRIPTION OF THE DRAWINGS

The above and other aspects, features, and advantages of the present invention will become more apparent in light of the following detailed description when taken in conjunction with the accompanying drawings in which.

DETAILED DESCRIPTION OF EXEMPLARY EMBODIMENTS OF THE INVENTION

Embodiments of the present invention will be described hereinbelow with reference to the accompanying drawings. In the following description, well-known functions or constructions are not described in detail to avoid obscuring the disclosure in unnecessary detail.

Figure 1:
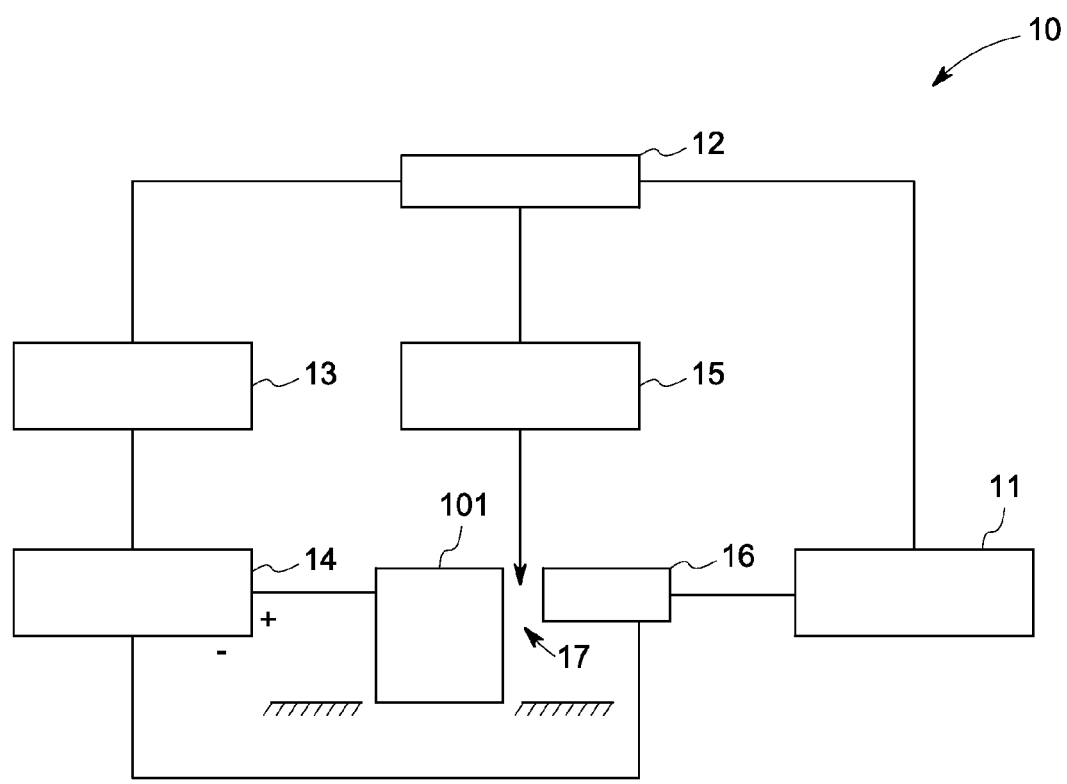
FIG. 1 is a schematic diagram of a machining system employing electroerosion machining in accordance with an embodiment of the present invention.

FIG. 1 illustrates a schematic diagram of a machining system 10 for machining a workpiece 101 in accordance with an embodiment of the present invention. It should be noted that the arrangement in FIG. 1 is merely illustrative. In embodiments of the present invention, the machining system 10 may comprise a computer numerical controlled (CNC) machine (or machining center) and may automatically machine the workpiece 101 according to preset control programs therein with one or more cutting tools, which may or may not be carried in a tool storage or magazine of the machining system 10.

In some embodiments, the one or more cutting tools of the machining system 10 may perform one or more respective machining processes. Non-limiting examples of the one or more machining processes may include one or more of conventional machining processes such as milling processes and electromachining processes such as electroerosion machining processes. As used herein, the term conventional machining may be different from the term electroerosion machining and indicate conventional mechanical machining using conventional cutting tools such as milling tools.

In a non-limiting embodiment, the machining system 10 functions as both an electroerosion machining device and a conventional machining device to perform both the electroerosion machining process and the milling process. As illustrated in FIG. 1, for electroerosion machining, the machining system 10 comprises a numerical control (NC) or computer numerical control (CNC) device (not shown) including a machine tool (working apparatus) 11, a CNC controller 12, a process controller 13, a power supply 14, an electrolyte supply 15, and an electrode 16.

In some embodiments, the NC or the CNC device may be used to perform conventional automated machining. In certain applications, the machine tool 11 may include servomotors (not shown) and spindle motors (not shown), which are known to one skilled in the art. The electrode 16 is mounted on a spindle (not shown) of the machine tool 11 for performing electroerosion machining. The servomotors may drive the electrode 16 and the workpiece 101 to move relative to each other at a desired speed and path, and the spindle motors drive the electrode 16 to rotate at a desired speed.

The CNC controller 12 comprises pre-programmed instructions based on descriptions of the workpiece 101 in a computer-aided design (CAD) and/or a computer-aided manufacturing (CAM), and is connected to the machine tool 11 to control the machine tool 11 to drive the electrode 16 to move according to certain operational parameters, such as certain feedrates, axes positions, or spindle speeds etc. In some embodiments, the CNC controller 12 may be a general CNC controller and comprise central processing units (CPU), read only memories (ROM), and/or random access memories (RAM). In a non-limiting embodiment, the CNC controller 12 comprises a controller, sold under the tradename GE-FANUC 18i CNC, by GE-Fanuc, of Charlottesville, Va.

In the illustrated example, the power supply 14 comprises a direct current (DC) pulse generator. The electrode 16 and the workpiece 101 are connected to negative and positive poles of the power supply 14 respectively so that the electrode 16 may function as a cathode and the workpiece 101 may act as an anode. In other examples, the polarities on the electrode 16 and the workpiece 101 may be reversed.

The process controller 13 is connected to the power supply 14 to monitor the status of voltages and/or currents in a gap 17 between the electrode 16 and the workpiece 101 during machining so as to monitor the status of the machining process of the machining system 10. Additionally, the process controller 13 communicates with the CNC controller 12 so as to control the movement of the electrode 16 and the workpiece 101 based on the status of the voltages and/or currents in the gap 17 between the electrode 16 and the workpiece 101.

In a non-limiting embodiment, the process controller 13 comprises a controller, sold under the tradename NI CompactRIO (cRIO), by National Instruments Inc., of Austin, Tex.

For some arrangements, each of the one or more controllers may comprise at least one of a computer, a database, and a processor. It should be noted that the present invention is not limited to any particular computer, database or processor for performing the processing tasks of the invention. The term computer, as that term is used herein, is intended to denote any machine capable of performing the calculations, or computations, necessary to perform the tasks of the invention. The term computer is intended to denote any machine that is capable of accepting a structured input and of processing the input in accordance with prescribed rules to produce an output.

In some embodiments, the electrolyte supply 15 may be in communication with and receive the pre-programmed instructions from the CNC controller 12 for passing an electrolyte between the electrode 16 and the workpiece 101. Alternatively, the electrolyte supply 15 may be disposed separately. Thus, during electroerosion machining, the power supply 14 may pass an electric current between the electrode 16 and the workpiece 10 to remove material from the workpiece 101 for forming a desired configuration while the electrolyte carries the removed material out of the gap 17. In non-limiting embodiments, the electrode 16 may have a cylindrical shape and comprise one or more of graphite, molybdenum, copper-graphite and copper-tungsten materials.

In certain applications, when the machining system 10 functions as the conventional machining device, such as a milling machine to perform convention machining, the electrode 16 may be detached from the spindle of the machine tool 11 and a conventional cutting tool (not shown) may be assembled onto the machine tool 11 for the conventional machining. Non-limiting examples of the conventional cutting tool may include a drilling tool, a milling tool including a ball end mill or a flat end mill, or other suitable cutting tools.

During the conventional machining, the CNC controller 12 may control the machine tool 11 to drive the cutting tool to machine the workpiece 101 while the electrolyte carries the removed material out of the gap 17, and the process controller 13 and the power supply 14 may not work. In some applications, at least one of the electrode 16 and the conventional cutting tool may be manually or automatically assembled onto and/or detached from the spindle of the machine tool 13.

Figure 2:
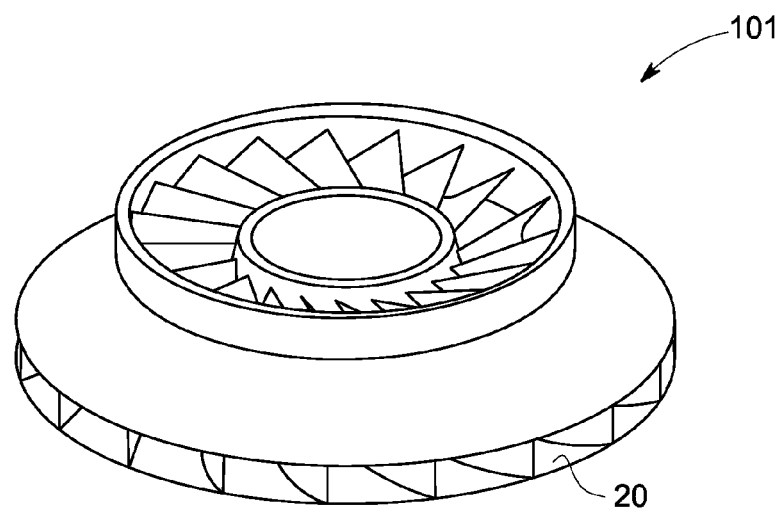
FIG. 2 is a schematic perspective diagram of a workpiece in accordance with an embodiment of the present invention.
Figure 3:
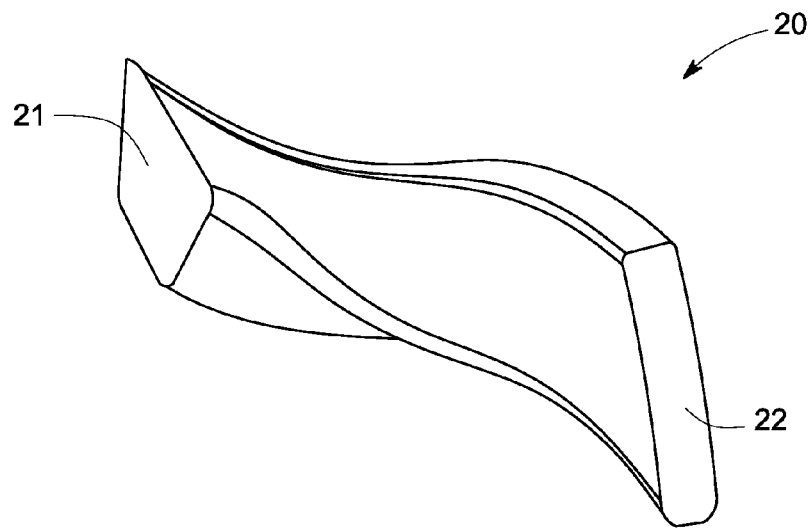
FIG. 3 is a schematic perspective diagram of a solid model of a conduit of the workpiece shown in FIG. 2 in accordance with an embodiment of the present invention.

FIGS. 2-3 illustrate schematic perspective diagrams of a workpiece 101 and a solid model of a conduit 20 of the workpiece 101. As depicted in FIGS. 2-3, the workpiece 101 comprises an impeller of a centrifugal compressor (not shown). The impeller 101 comprises seventeen conduits 20 through which compressed fluids pass. Each of the conduits 20 has a twisted complex geometry and comprises a trailing edge 21 and a leading edge 22. The machining system 10 is configured to machine the conduits 20 with twisted complex geometries within the impeller 101. In an embodiment, each conduit 20 is a sinuous conduit.

For the illustrated arrangements, each of the conduits 20 is a through hole with a closed periphery. In certain applications, each of one or more of the conduits 20 may be a through hole with at least a portion of the periphery opened.

Figure 4:
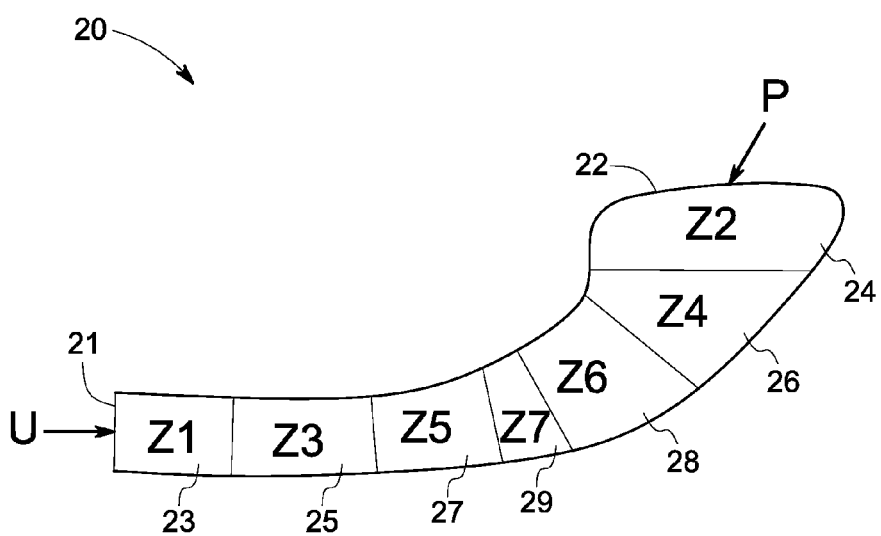
FIG. 4 is a schematic plane view illustrating machining of the conduit of the workpiece shown in FIGS. 2-3 in accordance with an embodiment of the present invention.

FIG. 4 illustrates a schematic plane view illustrating machining of a conduit 20 of the workpiece 101 shown in FIGS. 2-3. As illustrated in FIG. 4, prior to machining, the position and dimensions of the conduit 20 may be identified and the conduit 20 is segmented into seven target zones (segments) Z1, Z2, Z3, Z4, Z5, Z6 and Z7 according to the pre-programmed instructions in the CNC controller 12 based on descriptions of the conduit 20 of the impeller 101 in a computer-aided design (CAD) and/or a computer-aided manufacturing (CAM). In some applications, the segmentation of the conduit 20 may be determined based on experiments and/or experiences to avoid interference of the conduit 20 and the cutting tool such as the electrode 16 and/or the milling tool during machining.

During machining, as illustrated in FIGS. 1-4, the machining system 10 employs a first electroerosion machining to begin to machine the impeller 101 from the trailing edge 21. Meanwhile, the CNC controller 12 controls the machine tool 11 to drive the electrode 16 and the workpiece 101 to move relative to each other. The power supply 14 passes an electric current between the electrode 16 and the impeller 101 to remove materials from the first target zone Z1 to define a first cavity 23 within the first target zone Z1 along a first direction U while the electrolyte from the electrolyte supply 15 carries the removed materials out of the gap 17 between the electrode 16 and the impeller 101. The process controller 13 monitors the status of voltages and/or currents in the gap 17 and communicates with the CNC controller 12 to control the movement of the electrode 16 and the workpiece 101.

Similarly to the first electroerosion machining of the first target zone Z1, after formation of the first cavity 23, the machining system 10 employs a second electroerosion machining to machine the second target zone Z2 from the leading edge 22 so as to create a second cavity 24 within the second target zone Z2 along a second direction P. In certain applications, the first direction U and the second direction P are opposite directions. The sequence for the electroerosion machining of the target zones Z1 and Z2 may be reversed.

In non-limiting embodiments, after the first and second electroerosion machining of the first and second target zones Z1 and Z2, dimensions of the formed first and second cavities 23, 24 may be smaller than pre-determined dimensions of respective portions of the conduit 20. In a non-limiting embodiment, allowances may remain to be about 2 mm compared to the pre-determined dimensions of the conduit 20 after the electroerosion machining.

Accordingly, in certain embodiments, the electrode 16 may be detached from the machining system 10, and the conventional cutting tool, such as the milling tool may be assembled onto the machine tool 11 to perform first and second conventional machining to machine the first and second cavities 23, 24 along opposite directions so as to remove respective allowances. In certain applications, the milling tool may be employed to machine a cavity after the cavity is defined via a first electroerosion machining and prior to the formation of a next cavity via a second electroerosion machining. For example, the milling tool may be used to machine the cavity 23 after the cavity 23 is formed and prior to the formation of the second cavity 24.

For the illustrated arrangement in FIG. 4, after machining of first and second target zones Z1 and Z2, the milling tool and the electrode 16 may be detached from and assembled onto the machine tool 11 respectively, so that the machining system 10 further employs third and fourth electroerosion machining to machine the third target zone Z3 through the first cavity 23 and the fourth target zone Z4 through the second cavity 24 to define a third cavity 25 within the third target zone Z3 and a fourth cavity 26 within the fourth target zone Z4, respectively. In some embodiments, the subsequence of the third and fourth electroerosion machining of the third and fourth target zones Z3 and Z4 may be changed. In some applications, the machining system 10 may further employ the milling tool to perform third and fourth conventional machining to mill the third and fourth cavities 25, 26 remove at least a portion of respective allowances.

Next, the machining system 10 employs fifth and sixth electroerosion machining to define a fifth cavity 27 within the fifth target zone Z5 and a sixth cavity 28 within the sixth target zone Z6, and employs the milling tool to perform fifth and sixth conventional machining to machine the fifth and sixth cavities 27, 28 to remove at least a portion of respective allowances after the electroerosion machining of the fifth and sixth cavities 27, 28.

Finally, the machining system 10 employs the electroerosion machining and the milling tool seventhly in turn to define a seventh cavity 29 within the seventh target zone Z7 along the direction U. Accordingly, the seven cavities 23-29 are defined to communicate with each other to form the conduit 20 via alternating employment of the electroerosion machining and the conventional machining in the machining system 10. For some arrangements, the seven cavities may be machined separately according to the segmentation of the conduit 20 and the adjacent target zones in the conduit may be machined in different machining sequences, for example, the adjacent target zones Z2 and Z4 are machined in the second and fourth machining sequences respectively.

In some applications, after the electroerosion machining, the milling tool may remove a portion, such as about 1.5 mm of the allowances in the one or more respective cavities 23-29, which may be regarded as semifinishing of the one or more cavities 23-29. As a result, the machining system 10 may further employ the milling tool to machine the one or more of the cavities 23-29 to remove the respective residual allowances thereof for finish machining of the one or more cavities 23-29 to define the conduit 20 with pre-determined dimensions.

For the arrangements illustrated in FIGS. 2-4, the machining of one conduit 20 is taken as an example. When machining more than one, such as all of the seventeen conduits 20 within the impeller 101, the machining system 10 employs the first and second electroerosion machining to machine the seventeen first target zones Z1 from the respective trailing edges 21 to define the seventeen first cavities 23 and machine the seventeen second target zones Z2 from the respective leading edges 22 to define the seventeen second cavities 24 in turn.

Then, the machining system 10 may employ the milling tool to machine the seventeen first cavities 23 and the seventeen second cavities 24 to remove respective allowances. Subsequently, similar to the machining of all of the first and second cavities 23, 24, the machining system 10 may perform the electroerosion machining and the milling machining alternately to define all of the third, fourth, fifth, sixth and seventh cavities.

In non-limiting embodiments, after the seven cavities 23-29 of each of the seventeen conduits 20 are machined, the machining system 10 may further employ the milling tool for finish machining of the seven cavities 23-29 of each of the seventeen conduits 20 so as to define each of the seventeen conduits 20 with desired dimensions.

It should be noted that the arrangements in FIGS. 2-4 are merely illustrative. In certain applications, the milling machining for semifinishing and/or finish machining of the one or more cavities 23-29 may not be employed. The machining sequences of the cavities, such as the cavities 23 and 24, 25 and 26, and/or 27 and 28 may be reversed. The cavity 29 may be defined along the direction P. Additionally, the conduit 20 may be segmented into at least two target zones, so that the machining system 10 may employ the electromachining to machine the at least two target zones from opposite directions so as to define at least two cavities. A conventional machining may further be employed for semi-finishing and/or finish machining of the two cavities to define the desired conduit, and the at least two target zones may or may not be contiguous.

In embodiments of the invention, the machining system 10 may first employ electroerosion machining to define at least two cavities within at least two respective target zones from different directions. In non-limiting embodiments, the conventional machining may then be employed for semifinishing and/or finish machining of the at least two cavities so as to define a conduit in a workpiece. Compared to the conventional full milling processes, the electroerosion machining has higher efficiency and roughing steps such as milling flat and drilling through hole(s) in the conventional full mill processes may not be employed in the machining system 10, so that the machining cycle time may be reduced. Additionally, the arrangements of the invention may be used to retrofit the conventional CNC milling machine.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A machining system for machining a workpiece to form one or more conduits, the machining system comprising:
    a machine tool;
    a plurality of cutting tools configured to machine the workpiece to form the one or more conduits, the plurality of cutting tools comprising an electrode disposed on the machine tool;
    a computer numerical controller (CNC) configured to:
        control the machine tool and move the respective cutting tools relative to the workpiece; and
        identify position and dimensions of each of the one or more conduits to be formed in the workpiece, each of the one or more conduits comprising at least two target zones;
    a process controller configured to monitor gap status between the electrode and the workpiece, and to communicate with the CNC controller so as to control the machine tool;
    an electrolyte supply configured to pass an electrolyte in a gap between the workpiece and the respective cutting tools;
    a power supply configured to:
        energize the electrode and the workpiece to opposite electrical polarities; and
        pass an electric current between the electrode and the workpiece to remove materials from a first target zone to define a first cavity within the first target zone of the at least two target zones of each of the one or more conduits to be formed; and
    a mechanical cutting tool exchangeably disposed on the machine tool configured to perform a first mechanical machining step on the first cavity within the first target zone of each of the one or more conduits to be formed;
    wherein the machine tool, the electrode, the CNC controller, the power supply, the process controller and the electrolyte supply function together as an electroerosion machining device;
    wherein the machine tool, the CNC controller, the mechanical cutting tool and the electrolyte supply function together as a mechanical machining device;
    wherein the machining system is configured to function alternately as the electroerosion machining device or the mechanical machining device;
    wherein the power supply is further configured to pass the electric current between the electrode and the workpiece to remove materials from a second target zone to define a second cavity within the second target zone of the at least two target zones of each of the one or more conduits to be formed, and wherein the mechanical cutting tool is further configured to perform a second mechanical machining step on the second cavity within the second target zone of each of the one or more conduits to be formed, and
    wherein the first cavity and the second cavity are defined within the at least two respective target zones along opposite directions.

2. The machining system of claim 1, wherein the mechanical cutting tool comprises a milling tool.

3. The machining system of claim 1, wherein the first target zone is not contiguous with the second target zone.

4. The machining system of claim 1, wherein the workpiece comprises more than one conduit, and wherein each conduit of the more than one conduits is segmented into seven target zones.

5. The machining system of claim 1, wherein each of the one or more conduits is sinuous.

* * * * *